(12) United States Patent
Lang et al.

(10) Patent No.: US 9,386,776 B2
(45) Date of Patent: *Jul. 12, 2016

(54) CALCIUM FORTIFICATION OF BREAD DOUGH

(75) Inventors: Kevin W. Lang, Lloyd Neck, NY (US); James W. Dibble, Port Jefferson, NY (US); Gregory B. Murphy, Sands Point, NY (US)

(73) Assignee: Delavau L.L.C., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,394

(22) Filed: Jun. 13, 2012

(65) Prior Publication Data

US 2012/0263862 A1    Oct. 18, 2012

Related U.S. Application Data

(60) Continuation of application No. 12/879,742, filed on Sep. 10, 2010, now Pat. No. 8,221,808, which is a division of application No. 11/462,581, filed on Aug. 4, 2006, now Pat. No. 7,927,640, which is a continuation-in-part of application No. 11/155,136, filed on Jun. 16, 2005, now Pat. No. 7,169,417, which is a continuation-in-part of application No. 10/770,715, filed on Feb. 2, 2004, now Pat. No. 7,166,313.

(51) Int. Cl.
*A23L 1/304* (2006.01)
*A21D 2/02* (2006.01)
*A21D 2/04* (2006.01)
*A21D 2/14* (2006.01)

(52) U.S. Cl.
CPC .. *A21D 2/04* (2013.01); *A21D 2/02* (2013.01); *A21D 2/145* (2013.01); *A23L 1/304* (2013.01); *A23V 2002/00* (2013.01)

(58) Field of Classification Search
USPC ................................................. 426/267, 653
See application file for complete search history.

(56) References Cited

U.S. PATENT DOCUMENTS

| | | | |
|---|---|---|---|
| 2,970,915 A | 2/1961 | Ferrari | |
| 3,954,999 A | 5/1976 | Vidal et al. | |
| 4,219,590 A | 8/1980 | Shibazaki et al. | |
| 4,851,221 A | 7/1989 | Pak et al. | |
| 4,859,473 A | 8/1989 | Arciszewski et al. | |
| 5,066,499 A | 11/1991 | Arciszewski et al. | |
| 5,108,761 A | 4/1992 | Andon et al. | |
| 5,108,764 A | 4/1992 | Craig et al. | |
| 5,194,270 A | 3/1993 | Cante et al. | |
| 5,219,602 A | 6/1993 | Saleeb et al. | |
| 5,260,082 A | 11/1993 | delValle et al. | |
| 5,514,387 A | 5/1996 | Zimmerman et al. | |
| 5,945,144 A | 8/1999 | Hahn et al. | |
| 6,126,982 A | 10/2000 | Maldonado | |
| 6,210,720 B1 | 4/2001 | Leusner et al. | |
| 6,228,161 B1 | 5/2001 | Drummond | |
| 6,291,005 B1 | 9/2001 | Fuchs et al. | |
| 6,706,904 B1 | 3/2004 | Hartle et al. | |
| 6,761,912 B2 * | 7/2004 | Forusz et al. | ......... 424/682 |
| 7,166,313 B2 | 1/2007 | Diddle et al. | |
| 7,169,417 B2 | 1/2007 | Dibble et al. | |
| 7,595,075 B2 | 9/2009 | Lang et al. | |
| 7,927,640 B2 | 4/2011 | Lang et al. | |
| 2005/0170049 A1 | 8/2005 | Dibble et al. | |
| 2005/0238760 A1 | 10/2005 | Ballman et al. | |

FOREIGN PATENT DOCUMENTS

| | | |
|---|---|---|
| GB | 1 143 578 | 2/1969 |
| JP | 56-097248 | 8/1981 |
| JP | 62-501843 | 7/1987 |
| JP | 2-021783 | 5/1990 |
| JP | 2-501619 | 6/1990 |
| JP | 6-178644 | 6/1994 |
| JP | 8-066146 | 3/1996 |
| JP | 9-098738 | 4/1997 |
| JP | 9-121811 | 5/1997 |
| JP | 10-014481 | 1/1998 |
| JP | 2000-125749 | 5/2000 |
| JP | 2000-135060 | 5/2000 |
| JP | 2001-507762 | 6/2001 |
| JP | 2001-190227 | 7/2001 |
| JP | 2001-515019 | 9/2001 |
| JP | 2002-000170 | 1/2002 |
| JP | 2007-520219 | 7/2007 |
| WO | WO 2005/074477 | 8/2005 |

OTHER PUBLICATIONS

G.S. Ranhotra et al. "Increase in Bone Calcification in Young Rats Fed Breads Highly Fortified with Calcium," American Association of Cereal Chemists, Inc., vol. 76:3, pp. 325-327, 1999.
Specialty Minerals, Inc. Technical Data Sheet DS 2000 (SM TDS I).
Specialty Minerals, Inc. Technical Data Sheet IS 1105 (SM TDS II).
Rarthotra et al., "Stability of Enrichment Vitamins in Bread and Cookies", Cereal Chem., 63(5): 401-403 (1986).
Ranhotra et al., "Bioavailability of Calcium in Breads Fortified with Different Calcium Sources", Cereal Chem., 74(4): 361-63 (1997).
Kirk-Othmer, Encyclopedia of Chemical Technology, 717-719 (Kroschwitz et al., 4th ed. 1998).
Emodi et al., "Quality of Bread Fortified with Ten Micronutrients", Cereal Chem., 57(1): 1-3 (1980).

(Continued)

*Primary Examiner* — Lien T Tran
(74) *Attorney, Agent, or Firm* — Lewis Rice LLC

(57) ABSTRACT

Calcium additives useful for fortifying baked goods, such as bread products, with calcium are disclosed. The calcium additives are particularly useful for fortifying leavened baked goods with calcium. Methods for preparing the calcium additives and using the calcium additives to fortify baked goods are also disclosed. Generally, the calcium additives comprise intimate admixtures calcium carbonate and an acid such as citric acid.

15 Claims, No Drawings

(56) References Cited

OTHER PUBLICATIONS

Ziadeh et al., "Determination of Sensory Thresholds of Selected Calcium Salts and Formulation of Calcium-Fortified Pocket-type Flat Bread", J. Food. Sci., 70: S548-S552 (2005).

Moynihan et al., "Dietary sources of calcium and the contribution of flour fortification to total calcium intake in the diets of Northumbrian Adolescents," Br. J. Nutrit., 75: 495-505 (1996).

Product List from http:/www.mineralstech.com/pharmaceuticals. html website, Oct. 19, 2002 (SM TDS III).

Sudha et al., "Influence of micronutrients on rheological characteristics and bread-making quality of flour", Intl. J. Food Sciences and Nutrition, 59(2): 105-115 (2008).

U.S. Appl. No. 12/879,742, filed Sep. 10, 2010, Lang et al.

* cited by examiner

CALCIUM FORTIFICATION OF BREAD DOUGH

This application is a continuation under 35 U.S.C. §120 of U.S. patent application Ser. No. 12/879,742, filed Sep. 10, 2010, which is a divisional application of U.S. patent application Ser. No. 11/462,581, filed Aug. 4, 2006, now U.S. Pat. No. 7,927,640, which is a continuation-in-part of U.S. patent application Ser. No. 11/155,136, filed Jun. 16, 2005, now U.S. Pat. No. 7,169,417, which is continuation-in-part of U.S. patent application Ser. No. 10/770,715, filed Feb. 2, 2004, now U.S. Pat. No. 7,166,313, each of which are hereby incorporated by reference in their entirety.

FIELD OF INVENTION

The present invention relates generally to compositions and methods for enriching foods with calcium. More specifically, the present invention relates to additives comprising calcium carbonate and acid that are useful for enriching the calcium content of baked goods, particularly leavened bread products.

BACKGROUND OF THE INVENTION

Calcium is an essential nutrient and the most abundant mineral in the human body. Calcium plays a vital role in building healthy teeth and bones, blood clotting, muscle contraction, nerve function and heart function. In addition to these benefits, it has recently been suggested that calcium reduces the risk of recurrence of colon polyps. See Baron J. A. et al. *New England Journal of Medicine* 1999; 340: 101-107.

Most importantly, calcium reduces the risk of bone loss caused by osteoporosis in both men and women, a condition that afflicts more than 44 million individuals in the United States alone. With an aging population in the United States, it is estimated that the figure will rise to more than 61 million by the year 2020. This growing health crisis is largely a result of calcium deficiency in the diet.

In recognition of the benefits of calcium, doctors recommend high daily calcium intakes for people of all age groups. For example, the National Academy of Sciences ("NAS"), Institute of Medicine recommends the daily calcium intakes shown below.

| National Institute of Sciences, Institute of Medicine Dietary Reference Intake (DIR) of Calcium for Men And Women | |
|---|---|
| Age | DRI |
| 1-3 years | 500 mg |
| 4-8 years | 800 mg |
| 9-18 years | 1,300 mg |
| 19-50 years | 1,000 mg |
| 51 years and up | 1,200 mg |

Similarly, the United States Recommended Daily Allowance ("USRDA") of calcium for adults is 800 to 1,400 mg.

It has been estimated, however, that half of all Americans do not consume sufficient amounts of calcium. More troubling, 80% of women, the group at highest risk for developing osteoporosis, do not consume enough calcium. Further, estimates reveal that only 20% of girls and 50% of boys between the ages of 9 and 19 get the recommended daily intake of calcium. This is particularly troubling since 90% of human bone mass is developed by age 17. Thus, proper calcium consumption during these years is critical for preventing the onset of osteoporosis in later life.

For many individuals, it is difficult to meet the large daily intake of calcium suggested by physicians from dietary sources alone. This calcium deficiency is due in part to the low calcium content of foods that comprise the typical diet. Multi-vitamins and calcium supplement tablets represent an important alternative to dietary calcium. However, most commercially available multi-vitamin tablets provide only 10 to 20% of the recommended dose calcium. Calcium supplement tablets provide more calcium, typically 500 to 600 mg. To meet the recommendations, two tablets must be consumed daily. Unfortunately, too few people adhere to calcium supplement regimens, owing in part to the fact that presently available calcium tablets are very large and difficult or uncomfortable to swallow.

Milk is widely recognized as a good source of calcium. Several glasses of milk must be consumed each day in order to obtain sufficient calcium. For example, 9 to 18 year old children must consume at least four glasses of milk daily in order to receive the proper amount of calcium. However, the popularity of carbonated beverages has resulted in a decline in milk consumption among children. Further, many individuals who suffer from lactose intolerance cannot drink milk. Other individuals choose not to drink milk due to its high saturated fat content.

Health conscience consumers are increasingly demanding alternative sources of calcium from dietary products. This is evident from a recent study by Mintel's International showing an increase in food and drink products sold in North America which advertise calcium content. According to that study, 32% of dairy products, including milk and cheeses, 27% of beverages, and 18% of snacks advertise calcium content. In contrast, only 5% of bakery products noted calcium content. This is unfortunate since bread and cereal products are the most ubiquitous food source worldwide. For example, the U.S. Department of Agriculture estimates that approximately 200 pounds of flour and cereal products were consumed per capita in the United States in 2001, a figure which has been steadily growing for the past three decades. In contrast, only 22 gallons of milk were consumed per capita in the United States during the same period. Clearly, bread products would provide an ideal vehicle to supplement dietary calcium intake.

Unfortunately, conventional breads represent a poor source of calcium. The total mineral content of wheat generally ranges from 1 to 2% by weight. The minerals present in wheat are primarily distributed in the bran and are present in the endosperm, the wheat fraction from which most commercial flours are produced, to a much smaller degree. For instance, wheat typically contains about 0.45% by weight elemental calcium. The bran fraction contains about 0.128% by weight elemental calcium, whereas flour fractions such as farina, patent flour, and clear flour contain less than 0.03% by weight calcium. Breads made from these conventional flours will obviously contain only a small fraction of the recommended daily calcium intake.

It is conventional in the baking industry to add sources of calcium to bread products as "dough conditioners." Typically, calcium sulfate or calcium carbonate is added to dough in order to regulate pH and increase the electrolytic strength of soft water to prevent soft or sticky dough. Such calcium dough conditioners are usually added to dough from about 0.1 to 0.6% by weight. These calcium dough conditioners are not present in sufficient amounts to contribute significantly to the calcium value of the resulting bread products.

Calcium sulfate and calcium carbonate cannot be added directly to dough in sufficiently large amounts to contribute to the calcium content of bread due to inherent limitations imposed by the chemistry of the dough. In the fermentation process that occurs in leavened breads, pH plays a critical role in controlling yeast activity, amylolytic activity, and gluten behavior. The pH of bread typically ranges from about 5.1 to about 5.4. To reach these final pH levels, the dough must have final pH level as low as 4.5 to 5.2, however the pH must drop even lower during the fermentation process.

For example, in the typical commercial production of leavened bread by the sponge-dough process, the pH of the initially mixed sponge ingredients is about 5.3. As the fermentation process proceeds, the pH will rapidly drop over the first two hours of incubation. The drop in pH is principally the result of the lactic, succinic, and acetic acids produced by fermentation. Over the next two hours of fermentation, the pH will stabilize to a final value of about 4.7. When the remaining dough ingredients are added to the sponge, the pH will quickly rise back to its initial value of about 5.3 due to the diluting and buffering effects of the added flour. Subsequent fermentation again results in pH drop to a final value of about 5.0. As the dough is baked, volatilization of the fermentation acids causes the pH to rise to a final value of about 5.4 in the finished bread product. Some specialty breads such as French bread may have a pH as low as about 3.8 to 4.0, requiring even lower pH drops during the fermentation process.

Calcium salts such as calcium carbonate, calcium sulfate, and calcium citrate exert a buffering effect on dough chemistry by reacting with the organic acids produced during fermentation. Even relatively low levels of these calcium salts will prevent the pH from dropping during fermentation, interfering with the functioning of yeast and altering the flavor and texture of the resulting bread product. At higher levels, these salts can result in dough with a basic pH. Despite its low solubility in water, a saturated aqueous solution of calcium carbonate has a pH between 9 and 10 at ambient temperatures. Thus, calcium carbonate cannot be added directly to dough without upsetting the acidic pH characteristic of most bread dough. Further, the very low water solubility of calcium carbonate can result in granular precipitates when added in large quantities to dough. For these reasons, it is not adequate to fortify bread products by directly adding traditional calcium salts to dough.

To date, efforts to increase the calcium content of bread by other methods have met with only limited success.

U.S. Pat. No. 5,108,764 to Craig discloses the dough-up stage addition of calcium carbonate for its nutritive value in the production of reduced fat or no-added fat crackers. The amount of added calcium carbonate is described as "minor."

U.S. Pat. No. 6,126,982 to Maldonado discloses bread products having increased calcium contents produced from flours having large amounts of added middlings. That patent purports to provide bread products having up to 200% of the USRDA calcium dose per serving. However, the usefulness of the method disclosed by Maldonado is limited by the requirement of middling addition, since many commercial breads require highly purified flours.

U.S. Pat. No. 5,514,387 to Zimmerman, et al. discloses crackers and other baked goods providing greater than 10% of the USRDA calcium dose. The disclosed process uses emulsifier compositions such as combinations of polysorbate 60 and sodium stearoyl lactylate to reduce hardness and dry mouthfeel caused by the addition of insoluble calcium salts such as calcium carbonate. The fermented crackers produced by the method disclosed in this patent are reported to have pH values between 6.6 and 8.2, far higher than the tolerable pH of a typical commercial baked bread product.

U.S. Pat. Nos. 4,859,473 and 5,066,499 to Arciszewski et al disclose the addition of calcium carbonate to the dough-up stage in a process for preparing low sodium crackers and cookies. Calcium carbonate is added for its nutritive value in amounts up to about 10% by total weight. The resulting pH of the disclosed baked goods, between 6.5 and 8, is higher than the tolerable pH of most commercial baked bread products.

U.S. Pat. No. 6,210,720 to Leusner, et al. discloses lightly cooked cereal dough products fortified with at least 0.3% calcium. The disclosed process involves the addition of calcium carbonate having a small average particle size and a calcium sequestering agent such as phosphate salts or citric acid to a traditional cereal dough. The calcium carbonate and the calcium sequestering agent are added to the dough in conjunction with a wet blend. Calcium fortification of leavened bread products is not disclosed.

U.S. Pat. No. 5,945,144 to Hahn, et al. disclosed calcium fortified pasta produced by adding calcium salts such as calcium citrate to pasta dough before extrusion. The methods disclosed would not be applicable to prepare highly calcium fortified leavened bread products.

U.S. Pat. No. 5,260,082 to delValle, et al. discloses a calcium citrate additive for baked goods. The calcium citrate is prepared by reacting citric acid with calcium hydroxide or calcium carbonate in aqueous solution followed by spray drying to produce fine calcium citrate crystals. The calcium citrate crystals are added directly to the sponge to produce bread products alleged to have improved volume, shelf-life, and microwavability as compared to both control breads not having the additive and bread products prepared from commercially available calcium citrate. U.S. Pat. No. 5,260,082 does not disclose addition of calcium citrate to bread products for its nutritional value.

It would be desirable to enrich a variety of bread products with calcium in sufficient quantities to supply the recommended daily calcium dose. To this end, it would be desirable to enrich bread with calcium carbonate, since calcium carbonate is the most abundant and cost-efficient source of elemental calcium.

It is therefore an object of the present invention to provide bread products fortified with calcium, particularly in the form of calcium carbonate.

It is a further object of the present invention to provide calcium-fortified bread products having organoleptic properties, crumb structure, volume, and mouthfeel comparable to conventional breads.

It is a further object of the invention to provide calcium additives and methods for fortifying bread products with calcium additives.

SUMMARY OF INVENTION

In accordance with the foregoing objectives, the present invention provides foods, particularly baked products, such as bread products, that are highly fortified with calcium. Calcium additives and methods for preparing such calcium-fortified bread products are also provided.

In a first aspect of the invention, a calcium additive for dough is provided comprising an intimate admixture of: (a) an organic acid, preferably one which is solid at ambient temperature; and (b) calcium carbonate powder, preferably having a median particle diameter below about 30 μm (microns); wherein the weight ratio of calcium carbonate powder to organic acid is from about 1:1 to about 75:1.

In one variant, the calcium additive comprises an intimate admixture of: (1) calcium carbonate powder having a median particle size of about 12 to about 14 µm; and (2) an organic acid which is solid at ambient temperature; wherein the weight ratio of calcium carbonate powder to organic acid is from about 1:1 to about 75:1; and wherein the additive is substantially free of calcium salts of the organic acid.

In another variant, the calcium additive consists essentially of an intimate admixture of: (1) calcium carbonate powder having a particle size less than about 30 µm; and (2) citric acid; wherein the weight ratio of calcium carbonate powder to organic acid is from about 1:1 to about 75:1; and wherein the additive is substantially free of calcium citrate.

In a second aspect of the invention, compositions are provided comprising: (1) a calcium additive for dough comprising an intimate admixture of: (a) an organic acid which is solid at ambient temperature; and (b) calcium carbonate powder having a median particle diameter below about 30 µm, wherein the weight ratio of calcium carbonate powder to organic acid is from about 1:1 to about 75:1; and (2) a mixture of dough ingredients; and (3) water; wherein the weight ratio of water to the calcium additive is from about 1:1 to about 75:1; and wherein the water and dough ingredients may be provided separately or in admixture, meaning that the calcium additive may be added to dry dough ingredients or to hydrated dough ingredients; and further wherein the pH of the total composition, including calcium additive, dough ingredients, and water is below 7.

In a third aspect of the invention, a method of fortifying a baked product with calcium is provided comprising the steps of: (1) providing a calcium additive for dough comprising an intimate admixture of: (a) an organic acid which is solid at ambient temperature; and (b) calcium carbonate powder having a median particle diameter below about 30 µm, wherein the weight ratio of calcium carbonate powder to organic acid is from about 1:1 to about 75:1; and (2) providing (a) a mixture of dough ingredients and (b) water; wherein the weight ratio of water to the calcium additive is from about 1:1 to about 75:1; and wherein the water and dough ingredients may be provided separately or in admixture; and further wherein the pH of the total composition, including calcium additive, dough ingredients, and water is below 7; and (3) adding the calcium additive to the dough ingredients or admixture of dough ingredients and water in and amount sufficient to provide a baked product having an elemental calcium content of at least about 0.1% by weight.

In a fourth aspect of the invention, a method of fortifying a hamburger bun with calcium is provided comprising the steps of: (1) providing a calcium additive for dough comprising an intimate admixture of: (a) an organic acid which is solid at ambient temperature; and (b) calcium carbonate powder having a median particle diameter below about 30 µm, wherein the weight ratio of calcium carbonate powder to organic acid is from about 1:1 to about 75:1; (2) providing: (a) a mixture of dough ingredients and (b) water; wherein the weight ratio of water to the calcium additive is from about 10:1 to about 30:1; and wherein the water and dough ingredients may be provided separately of in admixture; and further wherein the pH of the total composition, including calcium additive, dough ingredients, and water is below 7, preferably between about 4.5 and about 6.5; and (3) adding the calcium additive to the dough ingredients or admixture of dough ingredients and water in and amount sufficient to provide a baked product having an elemental calcium content of at least about 0.1% by weight, preferably at least about 0.5% by weight, and more preferably at least about 1% by weight.

These and other aspects of the invention may be more clearly understood by reference to the following detailed description of the invention and the appended claims.

DETAILED DESCRIPTION OF THE INVENTION

In the following description of the invention, it is to be understood that the terms used have their ordinary and accustomed meanings in the art, unless otherwise specified. All weights referred to are given in terms of "% by weight" of the total composition, unless otherwise indicated. The term "% by flour weight" indicates that the ingredient is measured as a percentage of the total weight of flour alone. The term "elemental calcium" refers to the element calcium in any oxidation state, including $Ca^{+2}$. Accordingly, when the "weight" of elemental calcium is referred to herein, that phrase refers to the weight of the element calcium, whether the calcium is in the form of a salt or otherwise. As used herein, the symbol "µm" refers to micrometers (or microns).

It has surprisingly been found that solid mixtures of calcium carbonate and acid, such as citric acid, can be added to dough to increase calcium content without adversely affecting the properties of the dough. This is unexpected because it is known in the art that calcium carbonate cannot be directly added to bread dough on an equal weight basis as employed in the present invention because it will cause an unacceptable rise in the pH of the dough and interfere with the chemical processes of dough, e.g. leavening, and thus produces dough having unacceptable volume, crumb structure, texture and taste. Without wishing to be bound by any theory, it is believed that when the additives of the present invention are added to a mixture of dough ingredients including water, an acidic environment surrounding the fine calcium carbonate particles is established by the acid. The acidic environment of the calcium carbonate particles is believed to prevent or inhibit the formation of localized areas of high pH which would adversely effect dough quality.

In co-pending U.S. patent application Ser. No. 10/770,715 and U.S. patent application Ser. No. 11/155,136, both of which are incorporated by reference in their entirety, calcium additives for bread dough are disclosed which generally comprise a suspension of calcium carbonate powder in an aqueous solution of an inorganic or organic acid, such as citric acid. It was observed that the suspension remained sufficiently acidic to permit it to be added to dough without substantially altering the pH of the dough. The present invention is directed to a surprising variation of those additives and methods whereby it has been discovered that the additive, comprising powdered calcium carbonate and a solid acid, such as citric acid, may be prepared and provided in dry form and subsequently added to dough ingredients comprising water. The results obtained are superior to adding powdered calcium carbonate alone to bread dough because, as is well known in the art, when calcium carbonate is added directly to bread dough in amount sufficient to contribute to the nutritive value of the product the pH of the dough is raised above the acceptable limits for fermentation, leavening, etc.

The calcium additives of the invention comprise, consist of, or consist essentially of two components: (a) calcium carbonate powder; and (b) an organic acid. Preferably, but not necessarily, the calcium carbonate and acid are provided in intimate admixture. By "intimate admixture" is meant that the calcium carbonate powder and the organic acid have been mixed together to form a substantially homogeneous solid powder, as would be obtained, for example, by mixing calcium carbonate powder and citric acid in a V-blender or the like.

The weight ratio of calcium carbonate to organic acid, preferably citric acid, in the calcium additive typically, though not necessarily, ranges from about 1:1 to about 75:1 by weight. Preferably, the weight ratio of calcium carbonate to acid is about 4:1 to about 50:1, more preferably from about 10:1 to about 30:1, and more preferred still from about 15:1 to about 25:1. The optimum weight ratio to be employed will depend on a number of factors, including the molecular weight of the acid, the strength of the acid, and the pH of the dough. For example, doughs having low pH (i.e., about 3 to about 5.5) may require less acid in the additive because they can accommodate more calcium carbonate addition without a dramatic rise in pH as compared to doughs having a pH closer to 7 (i.e., about 5.5 to below 7). Therefore one skilled in the art will be guided by this observation and will preferably select a ratio toward the upper end of the range (e.g., about 25:1 to about 50:1) when working with such low pH doughs. Conversely, doughs such as white breads and hamburger buns, which are not typically highly acidic, may be found to benefit from additives having calcium carbonate toward the lower end of the range (e.g., about 4:1 to about 25:1). It is within the skill in the art to determine the optimum weight ratio of calcium carbonate to acid for any given combination of acid and dough. In the context of white breads and buns, in particular hamburger buns, a weight ratio of calcium carbonate to citric acid of about 18:1 to about 23:1, more particularly about 20:1 to about 22:1, is contemplated to be especially useful.

In the preferred practice of the invention, the calcium carbonate is provided as a powder having a small median particle size (diameter). The term "median" is used in this context to refer to the particle size at which half of the total volume of particles in the distribution is greater than the median and half of the total volume of particles is less than the median. By "small median particle size" is meant less than about 30 μm, more particularly less than about 25 μm or less than about 20 μm. This range has been found to be advantageous because, typically, the human mouth does not perceive a gritty texture from particles below about 30 μm in size. In various embodiments, the calcium carbonate is provided as a powder having a mean particle size from about 0.05 μm to about 30 μm; from about 1 μm to about 25 μm; from about 5 μm to about 20 μm; from about 10 μm to about 15 μm; or from about from about 12 μm to about 14 μm, each sub-range being an embodiment of the invention. The currently preferred calcium carbonate powder has a median particle size of about 13 μm.

It is well known in the art that calcium carbonate powders having a variety of median particle sizes are commercially available. For example, food grade and USP grade calcium carbonate powders having median particle sizes ranging from 0.7 to 20 μm are available from suppliers such as OMYA, Inc. (Alpharetta, Ga.), J. M Huber Corp. (Atlanta, Ga.), and Minerals Technologies Inc. (New York, N.Y.). Suitable calcium carbonate powders include but are not limited to those available from OMYA, Inc. under the trademarks OMYA-Cal FG 15, OMYA-Cal USP 15, OMYA-Cal LL OC FG 15 BTH, OMYA-Cal LL USP 15, OMYA-Cal LL USP 15 BTH, OMYA-Cal FG-10AZ, OMYA-Cal FG-6AZ, and OMYA-Cal USP-4AZ.

The organic acid component may be any organic acid that is compatible with food products, i.e., suitable for human consumption. Preferably the acid is one which is solid at ambient temperature, meaning that the acid has a melting point (m.p.), sublimation temperature (subl.), or decomposition temperature (dec.) greater than the ambient temperature. The term "ambient temperature" is not intended to be particularly limiting and generally refers to the environmental temperature at which the additive is stored, shipped, or used, for example the prevailing temperature inside of a bakery. Typically, but not necessarily, ambient temperature in a bakery will range from about 18° C. to about 32° C., and more typically about 26° C. to about 29° C. Suitable organic acids which may be used under a wide range of ambient conditions typically encountered during storage, shipping, or inside a bakery include, but are not limited to, adipic acid (m.p. ~153° C.), citric acid (m.p. ~153° C.), tartaric acid (m.p. ~206° C.), glutaric acid (m.p. ~95° C.), lactic acid (m.p. ~53° C.), ascorbic acid (dec. ~190° C.), glycolic acid (m.p. ~75° C.), malic acid (m.p. ~128° C.), maleic acid (m.p. ~131° C.), fumaric acid (subl. 300° C.), malonic acid (m.p. ~135° C.), and succinic acid (m.p. ~185° C.), and any combination thereof which is also solid at ambient temperature. Organic acids which are liquid near room temperature (typically ~21-23° C.) including, for example, acetic acid (m.p. ~16.7° C.), are also contemplated to be useful in the practice of the invention, however, the ambient temperature must be lowered accordingly so that the acid remains in the solid state while present in the calcium additive. For this reason, such acids, including acetic acid, are less preferred as inconveniently low temperatures would be required to maintain it as a solid during manufacture, shipping, storage, and use. Presently preferred organic carboxylic acids for use in the present invention include citric acid, fumaric acid, lactic acid, and malic acid. An especially preferred acid is citric acid. Preferably the citric acid is provided a dry powder and may comprising either anhydrous citric acid or citric acid monohydrate, or combinations thereof.

Preferably, the additives are free of or substantially free of calcium salts of the organic acid (including mono-, di-, and tri-calcium salts, etc.). By "substantially free of calcium salts of the organic acid," when used in relation to the calcium additives, means less than 2% by weight and preferably less than 1% by weight calcium salts of the acid based on the total weight of the additive. Preferably, the additives are free of or substantially free of calcium salts of citric acid. As used herein, "calcium salts of citric acid" refers to mono-, di-, and tri-calcium salts, including calcium citrate $Ca_3(C_6H_5O_7)_2$. By "substantially free of calcium salts of citric acid" means less than less than 2% by weight and preferably less than 1% by weight calcium salts of citric acid.

In one embodiment, the calcium additive comprises an intimate admixture of: (1) calcium carbonate powder; and (2) an organic acid which is solid at a ambient temperature, preferably solid between about 18° C. and about 38° C., and more preferably solid at room temperature. In preferred additives according to this embodiment the weight ratio of calcium carbonate to organic acid is between about 1:1 to about 75:1. Preferably, the additive is free of or substantially free of calcium salts of the organic acid.

In another embodiment, the calcium additive comprises an intimate admixture of: (1) calcium carbonate powder having a median particle size less than about 20 μm; and (2) an organic acid which is solid at ambient temperature, preferably solid at a temperature between about 18° C. and about 38° C., and more preferably solid at room temperature. In preferred additives according to this embodiment, the weight ratio of calcium carbonate powder to organic acid is from about 1:1 to about 75:1. Preferably, the additive is free of or substantially free of calcium salts of the organic acid.

In yet another embodiment, the calcium additive comprises an intimate admixture of: (1) calcium carbonate powder having a median particle size of about 12 to about 14 μm; and (2) an organic acid which is solid at ambient temperature, preferably solid at a temperature between about 18° C. and about 38° C., and more preferably solid at room temperature. In preferred additives according to this embodiment, the weight ratio of calcium carbonate powder to organic acid is from about 1:1 to about 75:1. Preferably, the additive is free of or substantially free of calcium salts of the organic acid.

In a further embodiment, the calcium additive comprises an intimate admixture of: (1) calcium carbonate powder having a median particle size of about 12 to about 14 μm; and (2) citric acid. Preferably the citric acid is provided a dry powder and may comprising either anhydrous citric acid or citric acid monohydrate, or combinations thereof. In preferred additives according to this embodiment, the weight ratio of calcium carbonate powder to organic acid is from about 1:1 to about 75:1. Preferably, the additive is free of or substantially free of calcium salts of citric acid.

In yet another embodiment, the calcium additive comprises an intimate admixture of: (1) calcium carbonate powder having a median particle size of about 12 to about 14 μm; and (2) citric acid powder; wherein the weight ratio of calcium carbonate powder to citric acid powder is from about 15:1 to about 25:1; and wherein the additive is free of or substantially free of calcium salts of citric acid.

The additives are useful for enriching the calcium content of any food product, however, the advantages of the present invention are most fully realized where the food product is a baked product, particularly a leavened baked product. Thus, useful compositions for baking will comprise: (1) a calcium additive for dough comprising an intimate admixture of: (a) an organic acid which is solid at ambient temperature; and (b) calcium carbonate powder having a median particle diameter below about 30 μm, wherein the weight ratio of calcium carbonate powder to organic acid is from about 1:1 to about 75:1; (2) a mixture of dough ingredients; and (3) water; wherein the weight ratio of water to the calcium additive is from about 1:1 to about 75:1; and wherein the pH of the total composition, including calcium additive, dough ingredients, and water is below 7.

The calcium additive may be added to the dry dough ingredients or may be added to the hydrated dough ingredients ("dough ingredients including water") or a combination the two. In the preferred practice, the dry additive is added to dough ingredients including water. In particular, the additives are preferably, but not necessarily, added to the dough portion in a so-called "sponge dough" process for bread-making. In that process, various dough ingredients are apportioned between the "sponge" and the "dough." Thus, as used herein, the term "dough ingredients" does not necessarily refer to the combined total of dough ingredients but rather refers to all of, or any portion of, the dough ingredients. Further, it will be understood that some amount of water can be added to the dry calcium additive prior to use without departing from the spirit of the present invention, however, care should be taken to avoid the formation of substantial amounts of calcium salts or the acid, as these are known to impart off-taste to the final product.

Bakeable composition according to the invention comprise calcium additives and a mixture of dough ingredients and water. The ratio of water to calcium additive in the bakeable compositions is not particularly limited and may be adjusted as desired by the skilled artisan as desired. Typically, the ratio of water to calcium additive is from about 2:1 to about 50:1 by weight based on the combined weight of water and calcium additive and more preferably between about 5:1 to about 40:1 by weight based on the combined weight of water and calcium additive. These amounts will vary depending on the type of process employed and the water apportionment between the pre-ferment (e.g. sponge) and the dough. For example, if the additive is added to the dough in a sponge dough process, the weight ratio of calcium additive to water in the sponge will be smaller than in the case where the additive is added to a straight dough because, because some of the total water will be sponge. Generally, the broad ranges given above will accommodate any dough making process. Where high levels of calcium additive are added to dough in a sponge dough process, the weight ratio of additive to water is somewhat more important as sufficient water must be present to both hydrate the gluten and fiber in the dough and solubilize the acid. Typically, a range of about 2:1 to about 30:1 (water to additive) will provide sufficient water in that case.

In another embodiment, a method is provided for fortifying a baked product with calcium. The method generally comprises adding the calcium additive to dough ingredients including water. This may include adding the calcium additive to hydrated dough ingredients or adding the calcium additive to dry dough ingredients followed by addition of water. Preferably the calcium additive is added to hydrated dough ingredients (i.e., dough). In one embodiment, the method comprises the steps of: (1) providing a calcium additive for dough comprising an intimate admixture of: (a) an organic acid which is solid at ambient temperature; and (b) calcium carbonate powder having a median particle diameter below about 30 μm, wherein the weight ratio of calcium carbonate powder to organic acid is from about 1:1 to about 75:1; and (2) providing (a) a mixture of dough ingredients and (b) water; wherein the weight ratio of water to the calcium additive is from about 1:1 to about 75:1; and wherein the water and dough ingredients may be provided separately or in admixture; and further wherein the pH of the total composition, including calcium additive, dough ingredients, and water is below 7; and (3) adding the calcium additive to the dough ingredient or mixture of dough ingredients and water in and amount sufficient to provide a baked product having an elemental calcium content of at least about 0.1% by weight, preferably at least about 0.5% by weight, more preferably at least about 1% by weight, and more preferred still, at least about 1.2%, 1.3%, 1.4%, 1.5%, 1.6%, or about 1.7% by weight, each of which is considered to be an embodiment of the present invention. In some embodiments, the level of elemental calcium can range from any of the foregoing minimum elemental calcium levels to as high as about 2.2% or even 2.5% by weight or even higher without sacrificing the organoleptic properties of the baked product.

When incorporated into the dough, the calcium carbonate preferably does not substantially react with the acid, meaning that salt formation is less than 10%, preferably less than 5%, and more preferred still less than 1% by weight based on the initial weight of calcium carbonate powder in the additive. However, it will be understood that the formation of small amounts of calcium citric, or other calcium acid salts, is not deleterious to the practice of the invention provided that such salts are not present in quantities sufficient to impart off-taste to the final baked product.

A preferred method is directed to fortifying buns, especially hamburger buns, with calcium. One skilled in the art will recognize that hamburger buns are notoriously difficult to fortify with calcium because the pH is typically between about 5 and about 6.5 and therefore is highly susceptible to the basicity of calcium carbonate. Also, consumers have come to expect a particular taste and mouthfeel from hamburger buns and slight deviations in quality are readily ascertained. The method of fortifying a bun, such as a hamburger bun, comprises the steps of: (1) providing a calcium additive for dough comprising an intimate admixture of: (a) an organic acid which is solid at ambient temperature; and (b) calcium carbonate powder having a median particle diameter below about 30 µm, wherein the weight ratio of calcium carbonate powder to organic acid is from about 1:1 to about 75:1; and (2) providing a mixture of dough ingredients; and (3) water; wherein the weight ratio of water to the calcium additive is from about 1:1 to about 75:1; and wherein the water and dough ingredients may be provided separately of in admixture; and further wherein the pH of the total composition, including calcium additive, dough ingredients, and water is below 7, preferably between about 4.5 and about 6.5; more preferably between about 5 and about 5.5 and (3) adding the calcium additive to the dough ingredients or admixture of dough ingredients and water in and amount sufficient to provide a baked bun having an elemental calcium content of at least about 0.1% by weight. In other embodiments, the calcium additive is added in an amount sufficient to produce a hamburger bun have any of the elemental calcium contents described herein.

Of course, the invention is not limited to particular bread products or doughs. The calcium additives may be added to any type of dough. Preferably, the dough comprises a leavening agent. It is contemplated that the dough may comprise any leavening agent known in the art including but not limited to chemical leavening agents and bacterial leavening agents. In the preferred practice of the invention, the leavening agent is yeast.

The calcium additives may be employed in any of the known methods for preparing bread dough, including but not limited to the "straight dough" method, the "sponge dough" method, the "continuous mixing" method, the "liquid sponge" method, the "liquid ferment" method, and the "no-time dough" method. The sponge dough method is the preferred method employed in commercial bakeries.

In the sponge dough method, a quantity of dough, called a "sponge," is prepared which serves as a pre-ferment. The sponge is combined with the balance of bread ingredients at a later stage. In a typical process, the sponge is formed by mixing over half of the flour, most if not all of the yeast, and a quantity of water sufficient to stiffen the dough, for about four minutes in a conventional dough mixer. The sponge is then set to ferment for about three to five hours depending on the amount of flour incorporated into the sponge. The fermented sponge is the mixed with the balance of ingredients in a dough mixer. The resulting dough is then set to ferment for an additional period from about fifteen minutes to one hour before baking. It will be understood that this procedure is merely representative and any variations and modifications of this method are contemplated to be with in the skill of the ordinary artisan In a sponge dough method, as with any method involving a pre-ferment stage, the calcium additive is preferably added to the dough rather than to the sponge. However, it is contemplated that the calcium additive may be added to the sponge before the remaining flour is combined with the sponge. Further, portions of the calcium additive may be added to both the sponge and the final dough. If a liquid ferment method is employed, it is preferable to add the calcium additive during the dough mixing stage after the ferment has been added, although this is not strictly necessary.

In one embodiment, the final pH of the dough is from about 3.0 to about 6.0. In another embodiment, the final pH of the dough is from about 4.0 to about 5.8. In yet another embodiment, the final pH of the dough is from about 5.0 to about 5.4.

The dough may contain any type of flour. Preferred flours are those traditionally used to prepare bread products. The most preferred flours according to the invention are those used to prepare white breads, buns, and rolls, such as patent flour and clear patent flour.

The term "flour" as used herein includes, but is not limited to patent flour, all-purpose flour, bleached flour, bread flour, cake flour, cookie flour, cracker flour, durum flour, enriched flour, farina, graham flour, pastry flour, rice flour, rye flour, self-rising flour, semolina, unbleached flour, wheat flour, whole-wheat flour, wheat meal, corn meal, corn flour, durum flour, rye meal, rye flour, oat meal, oat flour, soy meal, soy flour, sorghum meal, sorghum flour, potato meal, and potato flour.

Preferred flours for use in the present invention are patent flour, clear patent flour, all-purpose flour, farina flour, and bleached flour. The most preferred flours are those conventionally used to prepared white breads, buns, and rolls. Most preferred flours according to the invention have gluten contents from about 6 to about 14% by weight. In one embodiment of the invention, these preferred flours comprise 100% by weight of the total flour content of the dough. In other embodiments, the preferred flours comprise 99, 98, 97, 96, 95, 94, 93, 92, 91 or 90% by weight of the total flour content of the dough.

In one embodiment of the invention the dough comprises flour that is substantially free of wheat middlings. As used herein, flour that is "substantially free of wheat middlings" contains less than about 5% by weight wheat middlings. In another embodiment of the invention the dough comprises flour that is substantially free of bran. As used herein, flour that is "substantially free of bran" contains less than about 5% by weight bran. While bran and wheat middlings are known to comprise elemental calcium, it is contemplated that the bread products of the invention can contain higher amounts of elemental calcium than breads prepared with bran or wheat middling. However, the advantages of the present invention are most fully realized when the calcium additives are employed to enrich flours that have low natural levels of calcium, such as patent flours and the like.

While the foregoing description relates to dough made from flour, the invention is not so limited. It will be understood that the dough of the present invention may be prepared from flour alternatives. "Bread-type" products that do not comprise flour or are substantially free of flour may be prepared according to the present invention. Such bread-type products may be prepared from flour-free dough comprising, for example, gluten and grain. A bread-type product that is "substantially free" of flour will have a flour content of less than about 10% by weight based on total dry ingredients, and preferably will have a flour content of less than about 5% by weight based on total dry ingredients. In addition to flour, the dough may contain any ingredients known in the art for use in bread products, including but not limited to salt, fat and oil, sugar, shortening, butter, milk, dry milk, yeast food, eggs, and vegetable gums.

Calcium fortified dough prepared in accordance with the methods of this aspect of the invention is also provided. The dough may be any type of dough known in the art, including but not limited to bread dough, bagel dough, pasta dough, cereal dough, cracker dough, cookie dough, cake dough, pastry dough, and pizza dough.

A further aspect of the invention provides calcium fortified baked products comprising calcium from at least about 0.1% by weight, preferably at least about 0.5% by weight, more preferably at least about 1% by weight, and more preferred still, at least about 1.2%, 1.3%, 1.4%, 1.5%, 1.6%, or 1.7% by weight, each of which is considered to be an embodiment of the present invention. In some embodiments, the level of elemental calcium can range from any of the foregoing minimum elemental calcium levels to as high as about 2.2% or even 2.5% by weight or even higher without sacrificing the organoleptic properties of the baked product. The baked products according to this aspect of the invention preferably comprise flour that is substantially free of bran and/or wheat middlings. Preferably, the baked products comprise patent flour. In one embodiment, the pH of the calcium fortified baked product is from about 3.0 to about 6.0. In another embodiment the pH of the calcium fortified baked product is from about 4.0 to about 5.8. In yet another embodiment, the pH of the calcium fortified baked product is from about 5.0 to about 5.4.

The baked products according to this aspect of the invention are preferably bread products. The baked products according to this aspect of the invention may be leavened or unleavened bread products. The additives and methods disclosed herein are particularly useful in the preparation of leavened bread products. Baked products according to the invention include, but are not limited to, white bread, wheat bread, tortillas, rolls and buns, specialty/artisan breads, rye bread, whole grain varietals, bagels, pasta, grain-based snack foods, cereals, crackers, cookies, cakes, muffins, pastries, pancakes, pizza crusts, doughnuts, danishes, grain-based nutritional supplements, and salty snacks such as pretzels, tortilla chips, corn chips, and potato chips.

The baked products provided by the present invention can have a texture, crumb structure, taste, and "mouth feel" substantially identical to baked products that do not have added calcium. The baked products do not have a "grainy" texture that is characteristic of high levels of insoluble calcium carbonate.

While the calcium additives according to this embodiment of the invention are preferably employed to enrich the calcium content of baked goods, particularly leavened breads, it is contemplated that these additives will also be useful for enriching the calcium content of a variety of food products or beverages.

Hamburger bun dough prepared according the invention will preferably comprise wheat flour. In a preferred embodiment, the wheat flour is patent flour. The wheat flour preferably will comprise about 99, 98, 97, 96, 95, 94, 93, 92, 91 or 90% by weight of the total flour content of the hamburger bun dough, each being an embodiment of the invention. While patent flour is the preferred flour according to this aspect of the invention, other highly purified flours such as clear patent flour may be substituted for patent flour. The calcium additive is incorporated into the hamburger bun dough in a quantity sufficient to provide a hamburger bun upon baking having any desired elemental calcium content, as discussed above.

Preferably, the final baked products according to the invention will have one or more qualities selected from taste, texture, volume, and crumb structure, which is substantially identical to, or superior to, the same quality or qualities of an otherwise identical baked product (prepared from identical ingredient and under identical conditions) in the absence the calcium additive. Also, the final baked product will have one or more qualities selected from taste, texture, volume, and crumb structure, which is superior to the same quality or qualities of an otherwise identical baked product (prepared from identical ingredient and under identical conditions) to which either: (a) the same amount of calcium carbonate has been directly added to the dough; or (b) the same amount of calcium carbonate and solid acid, not in intimate admixture, have been added directly to dough. In making these qualitative evaluations, it will be understood that expert tasters employed within the food or baking industries may have more acute taste and/or texture (mouthfeel) perceptions that the average consumer. The evaluations described above may be performed by either such expert tasters or by typical consumers, as both will be able to discern the excellent taste, texture, etc. of products prepared according to the invention. By "substantially identical" is meant that the product will have the same level of consumer acceptance as determined by expert tasters, or preferably, by consumer research. A product which is "substantially identical" to another product (a control product) one or more of the parameters of taste, texture, volume, and crumb structure will be, for example, one which scores no less than one point below the control product on a scale of 1 to 10 for that quality based on panel testing, expert or otherwise. An identical product is one in which expert or consumer tests do not show a statistically significant difference in panel testing.

It will be understood that the recitation of certain ranges herein should not be construed to limit the disclosure to the endpoints disclosed. For example, the range "3.0 to 6.0" will be understood to disclose every value in between and is equivalent to the disclosure "3.0, 4.0, 5.0, and 6.0" or "3.0, 3.1, 3.2, 3.3 . . . 5.7, 5.8, 5.9, and 6.0." The intermediate values within each recited range are explicitly or inherently disclosed by the disclosure of the broader range. Similarly, the disclosure of a range will be understood to inherently disclose more narrow ranges therein. The phrase "about" is intended to modify every value within the range.

EXAMPLE 1

This Example provides a calcium-fortified white bread made using a calcium additive of the invention. The calcium additive was prepared by mixing dry calcium carbonate and dry citric acid in a weight ratio of 20.5:1. The bread was made with the sponge and dough technique using the ingredients listed in Table I. In this Example, the calcium additive was added to the dough rather than the sponge.

TABLE I

| Ingredient | Sponge[1] | Dough | Total | % by Flour Weight | % by Weight |
|---|---|---|---|---|---|
| Flour[2] | 700.00 | 300.00 | 1000.00 | 100.00 | 53.63% |
| Water | 437.00 | 117.00 | 554.00 | 55.40 | 29.71% |
| HFCS[3] | — | 182.00 | 182.00 | 18.20 | 9.76% |
| Yeast[4] | 14.00 | 6.00 | 20.00 | 2.00 | 1.07% |
| Vegetable Oil[5] | 12.54 | 37.00 | 49.54 | 4.95 | 2.66% |
| Salt[6] | 2.50 | 17.50 | 20.00 | 2.00 | 1.07% |
| SSL[7] | 3.00 | — | 3.00 | 0.30 | 0.16% |
| Datem[8] | — | 1.00 | 1.00 | 0.10 | 0.05% |
| Emulsifier[9] | — | 5.00 | 5.00 | 0.50 | 0.27% |
| Calcium Additive[10] | — | 15.43 | 15.43 | 1.54 | 0.83% |
| Calcium Sulfate | 9.50 | — | 9.50 | 0.95 | 0.51% |
| Calcium Propionate[11] | — | 1.10 | 1.10 | 0.11 | 0.06% |
| Gluten[12] | — | 4.00 | 4.00 | 0.40 | 0.21% |

[1]All weights are provided in grams;
[2]patent flour from ADM;
[3]high fructose corn syrup from A E Staley;
[4]Fleischmann's;
[5]soy oil from Riceland Foods;
[6]US Salt;
[7]stearoyl-2-lactylate sold under the name Emplex by American Ingredients;
[8]diacetyl tartaric acid esters of monoglycerides sold under the name Panodan by Danisco;
[9]Max Soft 90 from American Ingredients;
[10]the calcium additive was a dry blend of calcium carbonate having a median particle size of 13 microns and citric acid in weight ratio of 20.5:1;
[11]Fleischmann's;
[12]vital wheat gluten from Manildra.

The calcium-fortified white bread prepared in this Example was made from patent flour having a protein content of 11% by weight. The resulting bread contained 330 mg of elemental calcium for each 60 g serving size. The bread had a texture, crumb structure, taste, and "mouth feel" substantially identical to white bread.

The invention having been described by the forgoing description of the preferred embodiments, it will be understood that the skilled artisan may make modifications and variations of these embodiments without departing from the spirit or scope of the invention as set forth in the following claims.

We claim:

1. A dry calcium additive for use in a leavened bread product comprising an intimate admixture of: (1) calcium carbonate powder having a median particle size less than about 30 μm; and (2) an organic acid which is solid at ambient temperature; wherein the intimate admixture is in dry form; wherein the weight ratio of calcium carbonate powder to organic acid is from about 10:1 to about 75:1; and wherein the additive is substantially free of calcium salts of the organic acid.

2. The dry calcium additive of claim 1 wherein the organic acid is selected from the group consisting of citric acid, fumaric acid, lactic acid, and malic acid.

3. The dry calcium additive of claim 2 wherein the organic acid is citric acid.

4. The dry calcium additive of claim 3 wherein the weight ratio of calcium carbonate powder to citric acid is from about 10:1 to about 50:1.

5. The dry calcium additive of claim 4 wherein the weight ratio of calcium carbonate powder to citric acid is from about 10:1 to about 30:1.

6. The dry calcium additive of claim 5 wherein the weight ratio of calcium carbonate powder to citric acid is from about 15:1 to about 25:1.

7. The dry calcium additive of claim 6 wherein the weight ratio of calcium carbonate powder to citric acid is from about 18:1 to about 23:1.

8. The dry calcium additive of claim 1 wherein the calcium carbonate powder has a median particle size below about 20 μm.

9. The dry calcium additive of claim 8 wherein the calcium carbonate powder has a median particle size from about 10 μm to about 15 μm.

10. The dry calcium additive of claim 9 wherein the calcium carbonate powder has a median particle size from about 12 μm to about 14 μm.

11. Dough made from wheat flour and water, said dough comprising a leavening agent and the dry calcium additive of claim 1.

12. The dough of claim 11 wherein the pH of the dough, including the dry calcium additive, is below 7.

13. The dough of claim 12 wherein the pH of the dough, including the dry calcium additive, is from about 3.0 to about 6.0.

14. The dough of claim 13 wherein the pH of the dough, including the dry calcium additive, is from about 4.0 to about 5.8.

15. The dough of claim 14 wherein the pH of the dough, including the dry calcium additive, is from about 5.0 to about 5.4.

* * * * *